United States Patent
Brusilovsky

(10) Patent No.: US 11,215,493 B2
(45) Date of Patent: Jan. 4, 2022

(54) FLOWMETER AS AN ASSET

(71) Applicant: GE Infrastructure Sensing, LLC, Billerica, MA (US)

(72) Inventor: Mikhail Brusilovsky, Billerica, MA (US)

(73) Assignee: GE INFRASTRUCTURE SENSING, LLC, Billerica, MA (US)

( * ) Notice: Subject to any disclaimer, the term of this patent is extended or adjusted under 35 U.S.C. 154(b) by 90 days.

(21) Appl. No.: 16/529,088

(22) Filed: Aug. 1, 2019

(65) Prior Publication Data
US 2020/0041327 A1    Feb. 6, 2020

Related U.S. Application Data

(60) Provisional application No. 62/714,064, filed on Aug. 2, 2018.

(51) Int. Cl.
*G01F 25/00*        (2006.01)

(52) U.S. Cl.
CPC .................. *G01F 25/0007* (2013.01)

(58) Field of Classification Search
CPC ............. G01F 25/0007; G01F 25/0076; G01F 25/0084; G01F 25/0092
See application file for complete search history.

(56) References Cited

U.S. PATENT DOCUMENTS

| | | | | |
|---|---|---|---|---|
| 6,654,697 B1* | 11/2003 | Eryurek | .................... | G01F 1/50 702/100 |
| 6,766,276 B1* | 7/2004 | Dury | ..................... | G01F 1/667 324/357 |
| 2007/0192046 A1* | 8/2007 | Hairston | ................ | F04C 14/28 702/45 |
| 2009/0187356 A1* | 7/2009 | Artiuch | .............. | G01F 25/0007 702/45 |
| 2014/0109645 A1* | 4/2014 | Ramsay | .................... | G01F 1/00 73/1.34 |
| 2016/0123792 A1* | 5/2016 | Plaziak | ............... | G01F 25/0007 73/1.16 |
| 2018/0143048 A1* | 5/2018 | Lewis | ................... | G01F 1/3209 |

FOREIGN PATENT DOCUMENTS

JP        2003329502 A  * 11/2003

\* cited by examiner

*Primary Examiner* — Manuel L Barbee
(74) *Attorney, Agent, or Firm* — Mintz Levin Cohn Ferris Glovsky and Popeo, PC; Lisa Adams

(57) ABSTRACT

Diagnostic data characterizing operation of a flow meter in an industrial plant monitoring can be received. An asset state object characterizing a state of the flow meter can be determined. The determining can be performed by a data processor configured within the flow meter. The asset state object can be provided by the data processor. Related apparatus, systems, techniques, and articles are also described.

24 Claims, 5 Drawing Sheets

FLOWMETER AS AN ASSET

CROSS-REFERENCE TO RELATED APPLICATIONS

This application claims benefit of priority to U.S. Provisional Application No. 62/714,064, filed Aug. 2, 2018, the entire contents of each of which are incorporated herein by reference.

BACKGROUND

Some asset management software (AMS) products lack the ability to retrieve and/or process diagnostic information of flow meters. Currently, some AMS products can collect diagnostic parameters from a flow meter, but they lack the functionality to define whether operating parameters are within operating margins. Without sufficient flow meter operating health information, it can be difficult to assess whether a flow meter is operating correctly. If the data produced by a flow meter is inaccurate, it can prevent process modeling and optimization, which relies on the data produced by the flow meter, from being accurate.

SUMMARY

In one aspect, a method for flow meter monitoring using an improved flow meter is provided. In one embodiment the method can include receiving, by a data processor, diagnostic data characterizing operation of a flow meter configured within an industrial plant to monitor a flow rate of a fluid within a pipe associated with the industrial plant. The data processor configured within the flow meter. The method can further include determining, by the data processor and based on the received diagnostic data, an asset state object characterizing a state of the flow meter. The method can also include, providing, by the data processor, the asset state object.

In another aspect, a system for flow meter monitoring using an improved flow meter is provided. The system can include at least one data processor configured within a flow meter and a memory storing instructions configured to cause the at least one data processor to perform operations. The instructions, which when executed, can cause the at least one data processor to receive diagnostic data characterizing operation of the flow meter. The flow meter can be configured within an industrial plant to monitor a flow rate of a fluid within a pipe associated with the industrial plant. The instructions, which when executed, can further cause the at least one data processor to determine, based on the received diagnostic data, an asset state object characterizing a state of the flow meter. The instructions, which when executed, can further cause the at least one data processor to provide the asset state object.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Health status information for oil and gas equipment, such as a pump station, can be obtained, for example, using asset management software (AMS). Some AMS products lack the ability to retrieve and/or process diagnostic information of flow meters, which are instruments for measuring one or more properties (e.g., velocity or pressure) of a flow, sometimes of a fluid in a pipe. Flow meters can be used in the oil and gas industry, but can also can be used in other industries. Without knowing a comprehensive health state of a flow meter, it can be difficult to assess whether a flow meter is taking measurements of a flow correctly and whether accuracy is within margins. If the data produced by a flow meter is inaccurate, it can prevent process modeling and optimization by an asset performance manager software (e.g., a software program for achieving improved operational reliability and efficiency, and which can rely on the measurement data produced by the flow meter) from being accurate. To address this issue, a digital application is provided which can improve the diagnostics of a flow meter by providing information on the operating health of the flow meter.

The digital application can include a digital model which can create a flowmeter health object based on diagnostic data from a flow meter. The digital application can provide a comprehensive health state of the meter for use in asset management and optimization software. In some implementations, the digital application can be implemented in the flow meter itself, or on a digital industrial solution platform, or both.

The digital industrial solution platform can include a cloud-based, platform-as-a-service software platform that can be used to collect and analyze data from industrial machines. The digital industrial solution platform can enable industrial-scale analytics for asset performance management and operations optimization by providing a standard way to conduct machines, data, and people.

Figure 1:
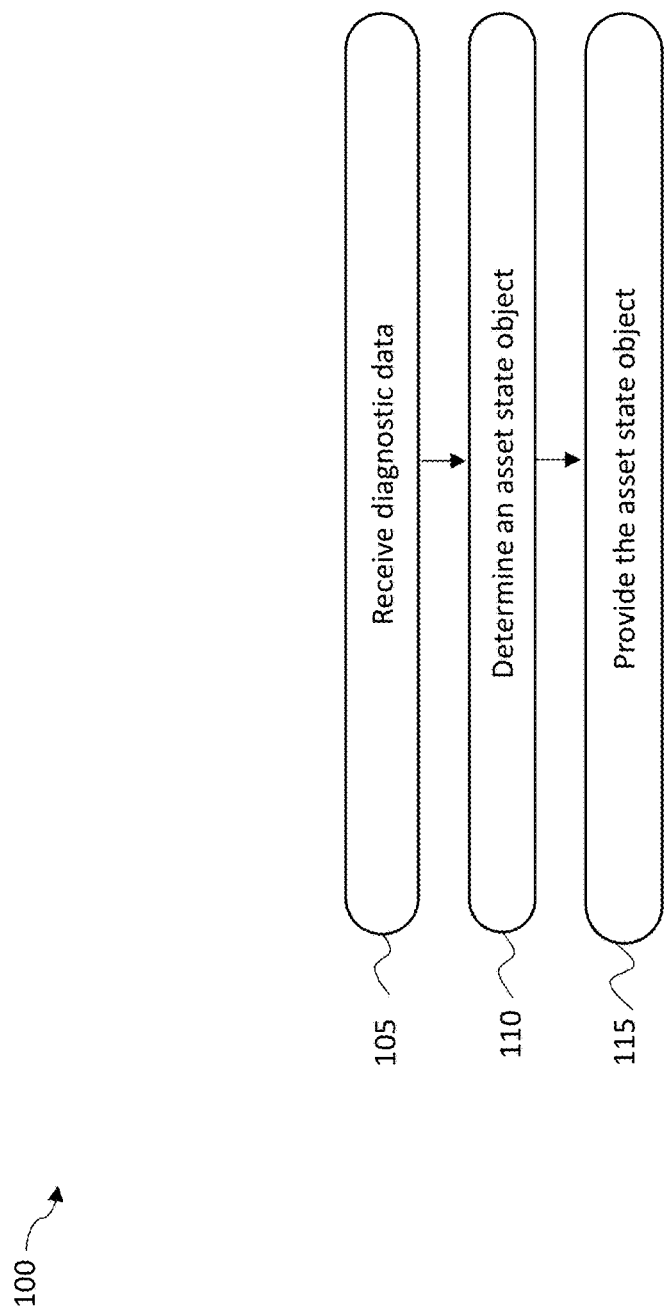
FIG. 1 is a process flow diagram illustrating an example process of some implementations of the current subject matter that can provide for an asset as a flowmeter.

FIG. 1 is a process flow diagram illustrating an example process 100 of some implementations of the current subject matter that can provide for improved flow meter monitoring.

At 105, diagnostic data characterizing operation of a flow meter in an industrial plant monitoring a flow rate of a fluid, such as oil, can be received. Flow meters can analyze the speed of sound to measure the flow through pipes as part of the process for improved efficiency, identification of problems and increased accuracy. The speed of sound for a particular gas, liquid, fluid, or other medium can describe how quickly sound waves can pass through the gas, liquid, fluid or other medium. The flow meter can include a clamp on flow meter or a wetted flow meter. Each type of flow meter can be configured to generate diagnostic data including an operating temperature, a liquid or gas temperature of a liquid or gas flowing through the flow meter, software errors, and/or hardware errors. In some implementations, the diagnostic data can include diagnostic parameters and configuration data. In some implementations, the diagnostic parameters and configuration data can include one or more parameters. For example, the diagnostic data can include sets of parameters data. In some embodiments, the diagnostic data can include 1-10, 15-30, 25-50, 40-75, or 70-100 parameters.

The diagnostic data can include per channel parameters such as temperature, sound speed, and amplitude for both clamp on and wetted flow meters. In some embodiments, for example, for clamp on flow meters, the diagnostic data can include a per channel parameter such as a wedge sound speed. The per channel wedge sound speed, for example, can indicate if a temperature sensor of the flow meter is operating correctly. In some embodiments, for example, for wetted flow meters, the diagnostic data can include a per channel parameter for wedge temperature, wedge temperature change, wedge interval, and/or time in wedge.

The diagnostic data can further include per channel parameters associated with a signal direction, such as in an upward or downward signal direction. The diagnostic data can include per channel parameters for a given signal direction for both clamp on and wetted flow meters, such as signal quality, signal-to-noise ratio, gain peak, and/or amplitude. For example, in some implementations, the signal-to-noise ratio can include a ratio of signal amplitude received from a transducer to its noise floor. In some implementations, for example in clamp on and wetted flow meters, the diagnostic data can include a signal file providing the per channel parameters for a given signal direction. The signal file can include at least one file per channel. In other implementations, the signal file can include five to seven files per channel. The signal file can include a collection of measurement points or data values that can be received by a receiving transducer. In some implementations, the collection of points included in the signal file can include about 1000 to 2000 points. Information contained within the signal file can be used, for example, for determination of an ultrasonic transit time.

For wetted flow meters, in some implementations, the diagnostic data can include per channel parameters for a given signal direction such as wedge signal quality, wedge signal to noise ratio, wedge gain, wedge peak, and wedge amplitude.

In some implementations, other types of diagnostic data can be received. The diagnostic data can vary based on the internal design of the flow meter, and any algorithm incorporated therein to calculate diagnostic, configuration, flow parameters or the like. In some implementations, one or more diagnostic and configuration parameters can be retrieved by one or more devices communicatively coupled to the flow meter.

At 110, an asset state object can be determined. Determining an asset state object can be performed by an asset model engine. The asset state object can characterize a state of the flow meter indicative of reliability of the flow meter. The asset state object can be implemented as an instance of a class, such as an object as used in object-oriented programming. The asset state object can be a flexibly formatted object allowing flow meter diagnostic data be more readily received and processed by AMS software products. The asset state object can be generated by initial processing of flow meter diagnostic parameters and subsequently combining the diagnostic parameters into an object format. Existing AMS systems are typically configured to receive or retrieve some but not all of a flow meter's individual diagnostic parameters. Processing the diagnostic parameters is time-consuming and error prone but is critical for determining the operational health of a flow meter. Often processing the diagnostic parameters required skilled personnel with specific experience as the flow meter operation or the diagnostic data. AMS software systems can be configured to process the diagnostic data once it has been appropriately formatted. Initial processing of diagnostic parameters can be performed in the flow meter, for example, to generate one or more signal files which can be included in an asset state object. However the raw signal files can hide complexity of the data and may not provide the best insight as to the operational health of the flow the meter. By presenting a health status of the flow meter in a format of an asset state object, the AMS software can simplify determining the state of health of the flow meter and can let this state be more easily read and processed by AMS software packages.

The flow meter can be configured with one or more diagnostic processing algorithms necessary to generate the asset state object. An asset model engine can include one or more diagnostic processing algorithms, which can be configured within a flow meter to perform initial processing of a diagnostic parameters of the flow meter and to combine the diagnostic parameters into an asset state object corresponding to the particular flow meter for which the diagnostic data is associated. In some embodiments, the asset model engine can implement or otherwise include a machine learning process or one or more predictive models which have been trained in a machine learning process to generate an asset state object based on the diagnostic data. In this way, the asset state object can be generated to include an accurate representation of the operational status or health of the flow meter. In some implementations, the asset state object can include a state associated with one or more flow meter parts, such as a set of transducers which can be configured for each channel, cabling, electronics, and the like.

At 115, the asset state object can be provided. In some implementations, the asset state object can be provided to AMS and/or optimization software for further processing. In some implementations, the asset state object can be output to a display of a computing device coupled to the flow meter. In some embodiments, the asset state object can provide an indication to operators in regard to the operational health of the flow meter. In some embodiments, the operational health indicated in the asset state object can be used to determine maintenance or service activities required to maintain the flow meter in an operational state. In some implementations, the asset state object can be used by AMS and/or optimization software to improve the operational efficiency of an industrial plant.

Figure 2:
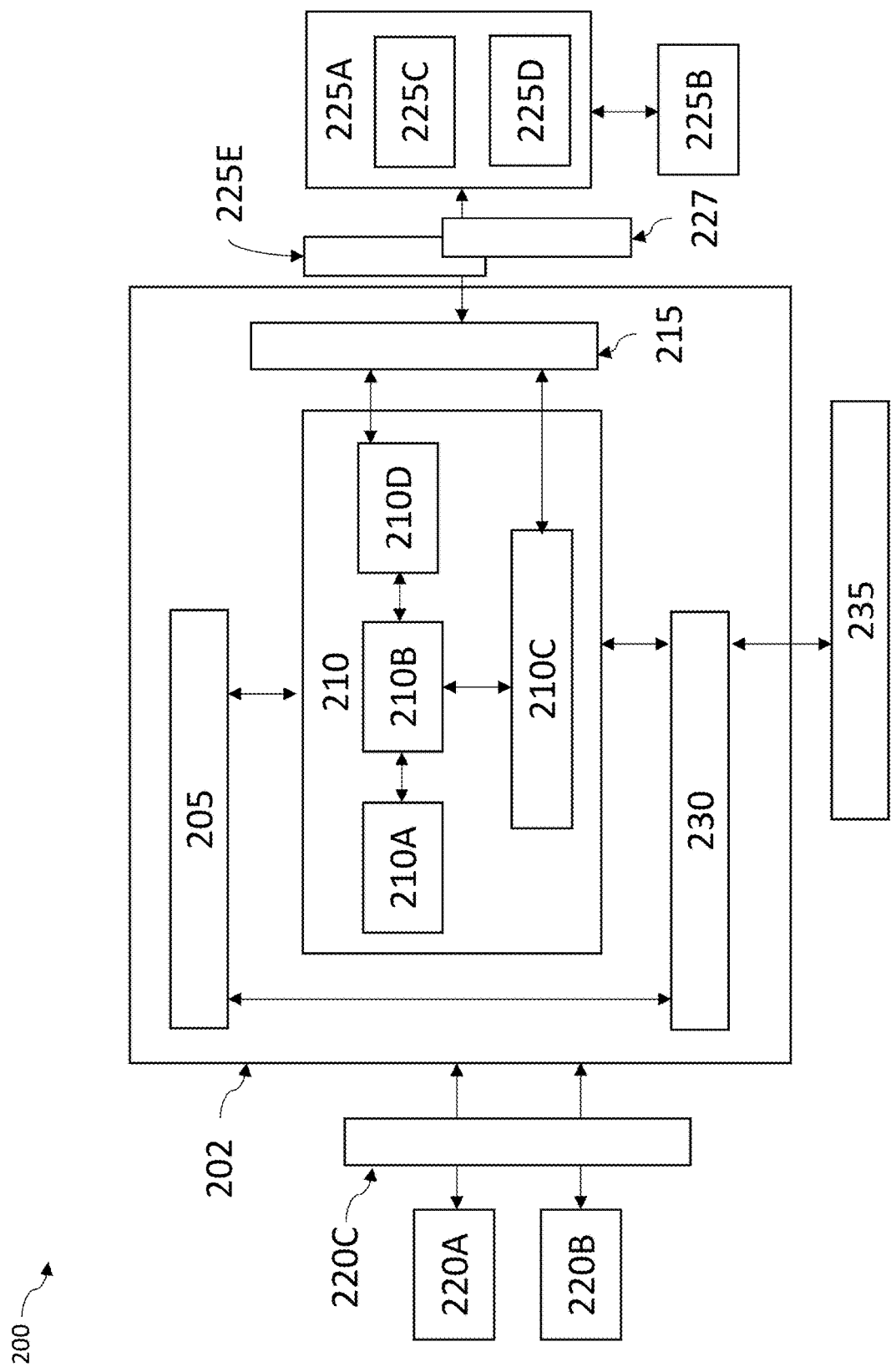
FIG. 2 is an example process flow diagram illustrating an example flowmeter asset of some implementations of the current subject matter that can provide for improved flow meter monitoring.

FIG. 2 is an example system block diagram illustrating an example system 200, including flow meter 202, configured to provide improved flow meter monitoring as described herein.

In some implementations, the system 200 can include a flowmeter 202 configured to include a flow measurement subsystem 205. The flow measurement subsystem 205 can be in operable communication with an asset model subsystem 210. Diagnostic parameters and configuration data can be retrieved by the flow measurement subsystem 205. The asset model subsystem 210 can include a diagnostic data repository 210A, which can receive diagnostic data from the flow measurement subsystem 205. In some implementations, the diagnostic data can include about one or more measurement or data points of diagnostic data. For example, the diagnostic data can include 100 items (over each of three channels which can be configured within the flowmeter 202). In some implementations, the diagnostic data can include a number of signal files. In some implementations, the diagnostic data repository 210A can include a memory, such as a database.

In some implementations, the diagnostic data can be transmitted to an asset model engine 210B. The asset model engine 210B can be in operable communication with an asset model 210C. In some implementations, the asset model engine 210B can include a processor configured to perform operations. The asset model 210C can provide instructions to the asset model engine 210B for processing of diagnostic data. Asset model engine 210B can execute an algorithm or predictive model to determine an asset state using the received diagnostic data and the instructions from the asset model 210C. In some implementations, the asset model 210C can be an XML script or similar format of computer-readable and executable instructions which can be used to analyze diagnostic data and signal files. In some implementations, the asset model 210C can include a processor configured to perform operations.

Asset model engine 210B can then output a flow asset object 210D containing the asset state, which can be provided to a first communications subsystem 215 for further processing. The communications subsystem 215, in some implementations, can include a hardware input/output device, such as a display, keyboard, mouse, terminal, or the like. The flow asset object 210D, in some implementations, can include information pertaining to the operational health of the flow meter 202 or a health status of the flow meter 202. In some implementations, the health status can be generated remotely. In some implementations, the health status can be generated in AMS software. In some implementations, it is an advantage of the described subject matter for flow measurement subsystem 205 and asset model subsystem 210 to operate in separate digital containers, so that flow measuring and flow calculation processes taking place in flow measurement subsystem 205 can continue uninterrupted and can utilize computing resources efficiently. Such a configuration can also allow for independent upgrades or modifications of the firmware of asset model subsystem 210, which can include new tasks to be executed in the flow meter.

In some implementations, the diagnostic data can originate from one or more transducers 220A and/or one or more gates 220B which can be transmitted to the flow meter 202 via a meter interface 220C. The meter interface 220C, in some implementations, can include a hardware input/output device. In some implementations, the flow asset object 210D can be provided to the first communications subsystem 215 for dissemination to a remote server 225A, which can run an AMS software package located in the cloud. In some implementations, the remote server 225A can be accessed by remote devices 225B. The first communications subsystem 215, in some implementations, can include a hardware input/output device, such as a display, keyboard, mouse, terminal, or the like.

In some implementations, the remote server 225A can include one or more processors 225C, which can be configured to perform operations, and storage 225D (e.g., a database or a memory), which can be accessed by the processors 225C. In some implementations, the provision of data to the remote server 225A can occur via a service interface 225E and via media 227. In some implementations, the media can include wired or wireless communication interfaces. Service interface 225E, in some implementations, can include a hardware input/output device, such as a display, keyboard, mouse, terminal, or the like. In some implementations, the asset model subsystem 210 can be in operable communication with a second communications subsystem 230, which can be in further communication with process interface 235. In some implementations, the process interface 235 can include an industrial bus or process interface. In some implementations, the health status can be generated remotely. In some implementations, the health status can be generated in AMS software.

Figure 3:
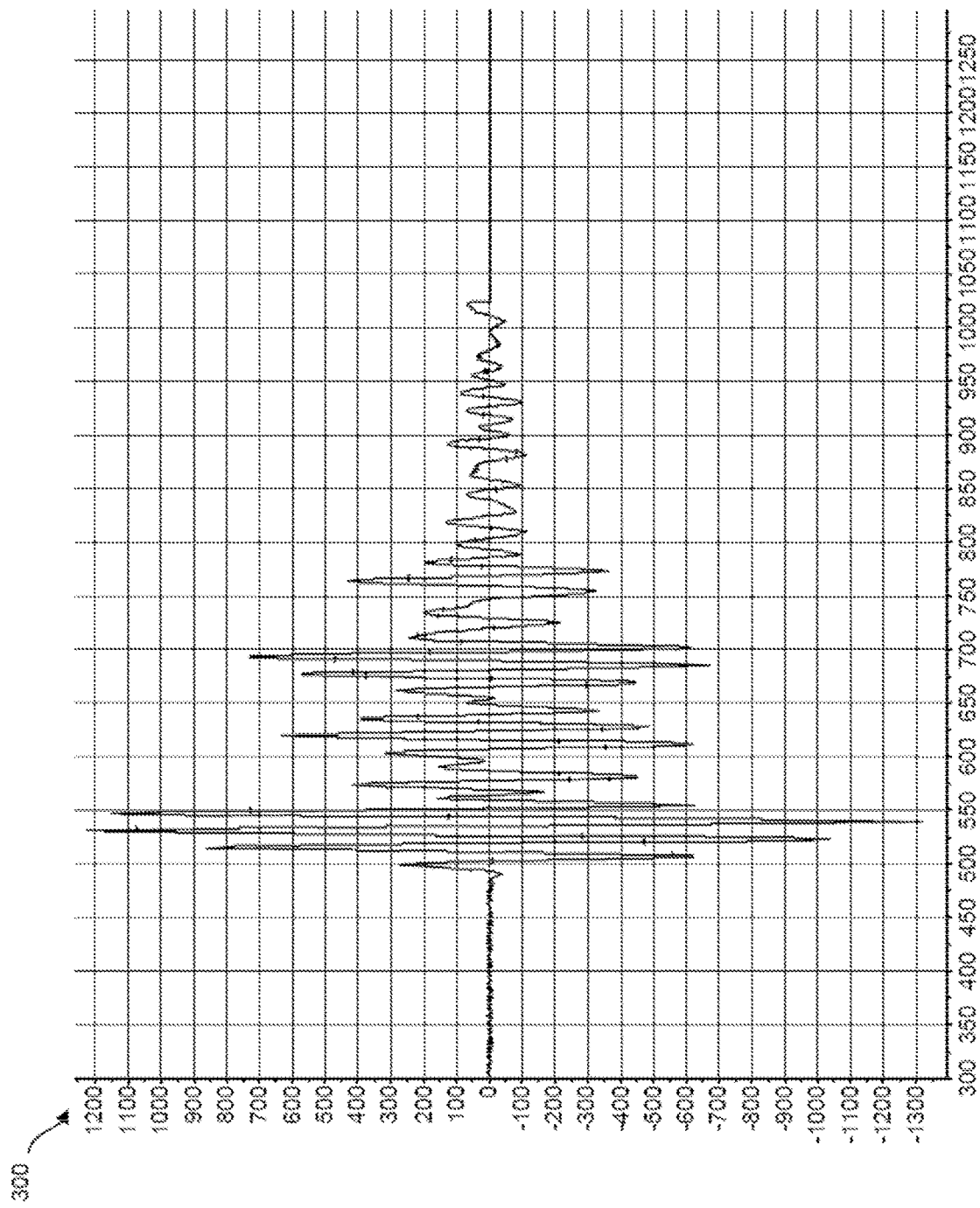
FIG. 3 is a plot displaying contents of an exemplary raw signal file output from a flow meter according to one embodiment.

FIG. 3 is a plot 300 displaying an exemplary representation of a raw signal file which can be output from a flow meter configured to measure transit time according to one embodiment, such as flow meter 202 of FIG. 2. The raw signal file can characterize an associated parameter (e.g., a signal-to-noise ratio, a per-channel wedge sound speed, a per-channel peak percentage, a pipe sound speed, an active interval, an active temperature change, and/or a peak percentage) as a value (y axis) over an index (x axis). Because the signal file is raw, the x and y axes are illustrated with relative dimensions corresponding to the values of the parameter and the index.

Figure 4:
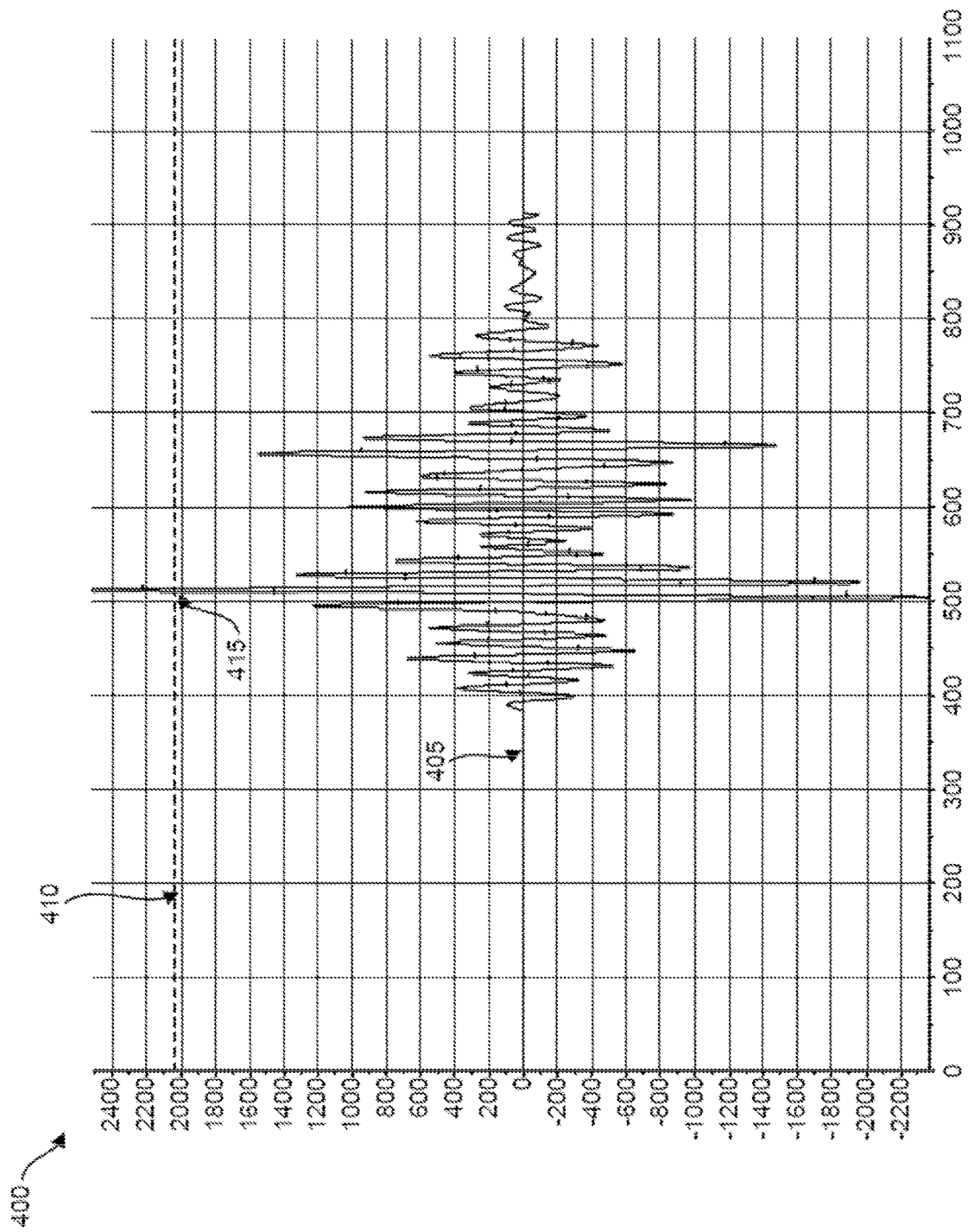
FIG. 4 is a plot displaying contents of an exemplary signal file, correlated upstream and downstream, with a horizontal line showing the peak percentage set in the flow meter according to one embodiment.

FIG. 4 is a plot 400 displaying an exemplary representation of a signal file which has been processed to correlate upstream and downstream transducer data. For example, as shown in FIG. 4, plot 400 includes a horizontal line 410 showing a current peak percentage set in a downstream line of the flow meter according to one embodiment. In operation, an operator can use the information in the correlated signal file to perform an operational analysis in order to ascertain whether the flowmeter is performing in an operationally healthy state and whether the flow is being measured by the flowmeter correctly. The position at which the upstream line 405 and the downstream line 410 cross (as illustrated by reference 415 shown in in FIG. 4), can indicate that the flowmeter may be providing inaccurate measurements or may be skipping cycles of measurements. In some existing systems, the operational analysis can be done with signal files only. In some existing systems, operational analysis can be performed only manually by service engineers.

Figure 5:
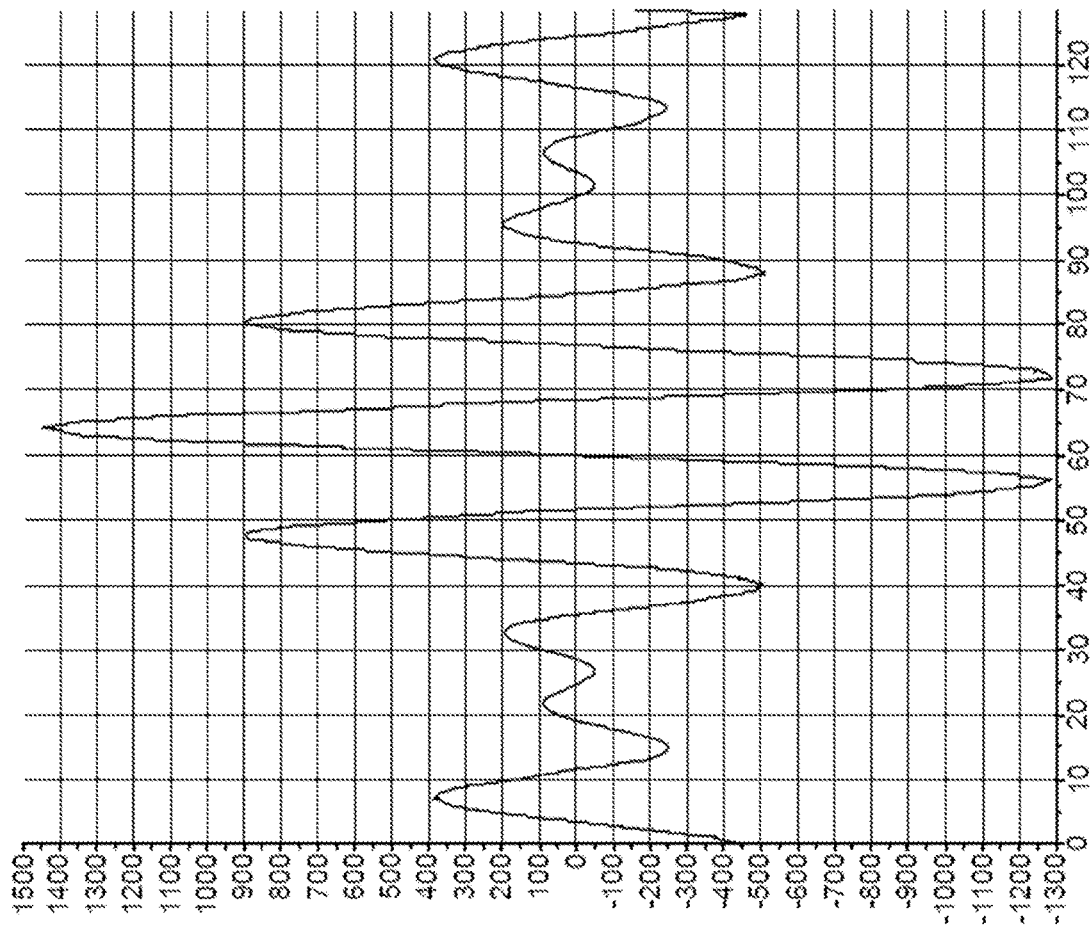
FIG. 5 is a plot displaying contents of an exemplary healthy cross-correlated signal file.

FIG. 5 displays an exemplary plot 500 displaying an exemplary representation of a cross-correlated signal file for an operationally healthy flow meter. The cross-correlated signal file can provide a measure or indication of similarity between components of the signal file. The cross-correlated signal file can characterize an associated parameter (e.g., a signal-to-noise ratio, a per-channel wedge sound speed, a per-channel peak percentage, a pipe sound speed, an active interval, an active temperature change, and/or a peak percentage) as a value (for example, a parameter value displayed on the y axis) over an index (for example, an index value displayed on the x axis).

The improved system as described herein addresses the technical problem of monitoring the operational status of a flow meter. The exemplary technical effects of the methods, systems, devices, and computer-readable mediums described herein can include improved operation of flow meters. The health status information provided as the output of some of the processes and systems described herein can allow for improved optimization of processes and operations that require the use of flow meters. In addition, an improved interface for interacting with the flow meter can result from the subject matter described herein. Remote analytics can be provided by the subject matter described herein, which can obviate the need to access a remote computer to analyze the diagnostic data. Additionally, the subject matter described herein can provide for improved communication between flow meters and some implementations of asset management software. For example, the subject matter described herein can process on-board the flow meter that which some implementations of asset management software are unable to process, such as diagnostic parameters and signal files, for the purpose of providing a health status of a flow meter. Thus, health status information generated by the subject matter described herein can be passed to any AMS platform, without the need to incorporate functionality for generation of health status information into AMS platforms.

Thus the system represents an improvement of computer functionality that processes diagnostic data associated with flow meter and generates state data corresponding to a flow meters types or corresponding to a sensor, such as a transducer which many be configured in relation to the flow meter. Additionally, the remote devices 225B can include an improved display or graphical user interface (GUI) that provides more efficient visualization and execution of diagnostic and state data such as when visualizing one or more parameters associated with the flow meter or sensors which can be configured in relation to the flow meter. The improved GUI can also provide enhanced visualizations for alerts or notifications of abnormal operating states, planning maintenance or repair procedures for flow meters based on the diagnostic or state data, or for managing production rates of the industrial plant within desirable ranges.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
receiving, by a data processor configured within a flow meter, diagnostic data characterizing operation of the flow meter configured within an industrial plant to monitor a flow rate of a fluid within a pipe associated with the industrial plant, wherein the diagnostic data includes a sound speed;
determining, by the data processor and based on the received diagnostic data, an asset state object characterizing a state of the flow meter; and
providing, by the data processor, the asset state object.

2. The method of claim 1, wherein the diagnostic data includes a signal-to-noise ratio, a signal file, a per-channel sound speed, a per-channel wedge sound speed, a per-channel peak percentage, a temperature, and/or a peak percentage.

3. The method of claim 1, wherein the asset state object is determined using an asset model engine including a predictive model and/or machine learning engine.

4. The method of claim 1, wherein the state of the flow meter includes an indication of the flow meter's reliability.

5. The method of claim 4, wherein the state of the flow meter includes an indication of a downgrade of measurement accuracy, a number of failures, a channel status, and/or an overall status associated with the flow meter.

6. The method of claim 1, wherein the asset state object includes an indication of reliability corresponding to one or more sensors coupled to the flow meter.

7. The method of claim 6, wherein the asset state object includes an indication of a deterioration in transmission and/or reception associated with the one or more sensors coupled to the flow meter.

8. The method of claim 6, wherein the one or more sensors includes a transducer.

9. A system comprising:
at least one data processor configured within a flow meter; and
memory storing instructions configured to cause the at least one data processor to perform operations comprising:
receiving diagnostic data characterizing operation of the flow meter, wherein the diagnostic data includes a sound speed and the flow meter is configured within an industrial plant to monitor a flow rate of a fluid within a pipe associated with the industrial plant;
determining, based on the received diagnostic data, an asset state object characterizing a state of the flow meter; and
providing the asset state object.

10. The system of claim 9, wherein the diagnostic data includes a signal-to-noise ratio, a signal file, a per-channel sound speed, a per-channel wedge sound speed, a per-channel peak percentage, a temperature, and/or a peak percentage.

11. The system of claim 9, wherein the asset state object is determined using an asset model engine including a predictive model and/or machine learning engine.

12. The system of claim 9, wherein the state of the flow meter includes an indication of the flow meter's reliability.

13. The system of claim 12, wherein the state of the flow meter includes an indication of a downgrade of measurement accuracy, a number of failures, a channel status, and/or an overall status associated with the flow meter.

14. The system of claim 9, wherein the asset state object includes an indication of reliability corresponding to one or more sensors coupled to the flow meter.

15. The system of claim 14, wherein the asset state object includes an indication of a deterioration in transmission and/or reception associated with the one or more sensors coupled to the flow meter.

16. The system of claim 14, wherein the one or more sensors includes a transducer.

17. A non-transitory computer readable medium storing instructions which, when executed by at least one data processor forming part of at least one computing system, cause the at least one data processor to implement operations comprising:
receiving diagnostic data characterizing operation of a flow meter configured within an industrial plant to monitor a flow rate of a fluid within a pipe associated with the industrial plant, the diagnostic data received by a data processor configured within the flow meter, wherein the diagnostic data includes a sound speed;
determining, based on the received diagnostic data and by the data processor configured within the flow meter, an asset state object characterizing a state of the flow meter; and
providing, by the data processor configured within the flow meter, the asset state object.

18. The non-transitory computer readable medium of claim 17, wherein the diagnostic data includes a signal-to-noise ratio, a signal file, a per-channel sound speed, a per-channel wedge sound peed, a per-channel peak percentage, a temperature, and/or a peak percentage.

19. The non-transitory computer readable medium of claim 17, wherein the asset state object is determined using an asset model engine including a predictive model and/or machine learning engine.

20. The non-transitory computer readable medium of claim 17, wherein the state of the flow meter includes an indication of the flow meter's reliability.

21. The non-transitory computer readable medium of claim 20, wherein the state of the flow meter includes an indication of a downgrade of measurement accuracy, a number of failures, a channel status, and/or an overall status associated with the flow meter.

22. The non-transitory computer readable medium of claim 17, wherein the asset state object includes an indication of reliability corresponding to one or more sensors coupled to the flow meter.

23. The non-transitory computer readable medium of claim 22, wherein the asset state object includes an indication of a deterioration in transmission and/or reception associated with the one or more sensors coupled to the flow meter.

24. The non-transitory computer readable medium of claim 22, wherein the one or more sensors includes a transducer.

\* \* \* \* \*